United States Patent [19]

Scharman et al.

[11] Patent Number: 5,305,726
[45] Date of Patent: Apr. 26, 1994

[54] CERAMIC COMPOSITE COATING MATERIAL

[75] Inventors: Alan J. Scharman, Hebron; Alfred P. Matarese, North Haven; Harry E. Eaton, Jr., Woodstock, all of Conn.

[73] Assignee: United Technologies Corporation, Hartford, Conn.

[21] Appl. No.: 954,450

[22] Filed: Sep. 30, 1992

[51] Int. Cl.$^5$ ............................................. F02B 75/08
[52] U.S. Cl. ................................. 123/668; 123/193.6; 427/204; 428/432
[58] Field of Search ................... 123/668, 669; 92/212, 92/223; 29/888.045, 888.048; 427/126.1, 126.2, 126.3, 126.4, 204, 205, 419.1, 419.6; 428/432

[56] References Cited

U.S. PATENT DOCUMENTS

| | | | |
|---|---|---|---|
| 3,359,192 | 11/1970 | Prasse | 277/224 |
| 4,245,611 | 1/1981 | Mitchell et al. | 123/193.6 |
| 4,481,237 | 11/1984 | Bosshart et al. | 427/34 |
| 4,495,907 | 11/1985 | Kamo | 126/669 |
| 4,503,130 | 3/1985 | Bosshart et al. | 428/632 |
| 4,542,111 | 9/1985 | Buran et al. | 427/34 |
| 4,561,406 | 12/1985 | Ward | 123/536 |
| 4,574,590 | 3/1986 | Jones | 60/676 |
| 4,587,177 | 5/1986 | Toaz et al. | 428/614 |
| 4,588,607 | 5/1986 | Matarese et al. | 427/34 |
| 4,645,716 | 2/1987 | Harrington et al. | 428/472 |
| 4,651,630 | 3/1987 | Zeilinger et al. | 92/212 |
| 4,711,208 | 12/1987 | Sender et al. | 123/669 |
| 4,735,128 | 4/1988 | Mahrus et al. | 92/212 |
| 4,738,227 | 4/1988 | Kamo et al. | 123/23 |
| 4,739,738 | 4/1988 | Sander et al. | 123/668 |
| 4,975,314 | 12/1990 | Yano et al. | 428/432 |

FOREIGN PATENT DOCUMENTS

0340791 11/1989 European Pat. Off. .

OTHER PUBLICATIONS

*Thick Thermal Barrier Coating for Diesel Components,* Monthly Progress Reports 39, 40 and 41 (Jun., Jul., and Aug. 1989), Contract DEN3-331, by T. M. Tonushonis, Cummins Engine Company Inc., prepared for NASA-Lewis Research Center.

*Primary Examiner*—Noah P. Kamen
*Attorney, Agent, or Firm*—George J. Romanik

[57] ABSTRACT

A ceramic coating for a metal article includes a metallic bond coat deposited on the metal article, at least one MCrAlY/ceramic layer deposited on the bond coat, and a ceramic composite top layer deposited on the MCrAlY/ceramic layer. The M in MCrAlY stands for Fe, Ni, Co, or a mixture of Ni and Co. The ceramic in the MCrAlY/ceramic layer comprises mullite, alumina, zircon, sillimanite, sodium zirconium phosphate, fused silica, cordierite, aluminum titanate, or zirconia. The ceramic composite top layer comprises a ceramic matrix and at least one secondary phase. A method of making the coating includes sequentially depositing a metallic bond coat on the metal article, at least one MCrAlY/ceramic layer on the bond coat, and a ceramic composite top layer on the MCrAlY/ceramic layer.

15 Claims, 2 Drawing Sheets

CERAMIC COMPOSITE COATING MATERIAL

This invention was made with Government support under contract number DAAE07-84-C-R082 awarded by the Department of the Army. The Government has certain rights in this invention.

CROSS-REFERENCE TO RELATED APPLICATIONS

This application is related to U.S. application Ser. No. 07/890,459, filed on May 29, 1992, entitled "Ceramic Thermal Barrier Coating for Rapid Thermal Cycling Applications."

TECHNICAL FIELD

The present invention is directed to a ceramic composite coating material.

BACKGROUND ART

To improve performance and efficiency, future internal combustion engines will operate at higher temperatures and pressures than present-day engines. For example, commercial diesel engines may operate at cylinder temperatures of about 760° C. (1400° F.) to about 870° C. (1600° F.) and brake mean effective pressures up to about 1030 kPa (150 psi). Military diesel engines may operate at cylinder temperatures up to about 925° C. (1700° F) and brake mean effective pressures greater than about 1380 kPa (200 psi). Such conditions, combined with rapid thermal cycling induced by the cylinder firing cycle, create a severe environment for in-cylinder engine parts. To operate under such conditions, critical engine parts must be insulated. Insulation lowers the temperature of the parts and reduces the amount of heat rejected to the environment. To be cost effective, the insulation should have a service life greater than about 20,000 hours.

U.S. Pat. No. 4,738,227 to Kamo et al. describes a two-layer thermal barrier coating for insulating parts in internal combustion engines. The coating includes a base layer of zirconia ($ZrO_2$) plasma sprayed over a metal engine part. The $ZrO_2$ layer is covered with a layer of a wear resistant ceramic to improve its serveice life. Suitable wear resistant ceramics include one containing silica ($SiO_2$), chromia ($Cr_2O_3$) and alumina ($Al_2O_3$) and another based on zircon ($ZrSiO_4$).

U.S. Pat. No. 4,711,208 to Sander et al. discloses coating piston heads with several layers of flame or plasma sprayed material. The layers can include $ZrO_3$, $ZrSiO_4$, metal, and cermet. Sander et al. also teach that an aluminum titanate piston crown insert covered with a fully stabilized $ZrO_2$ coating can replace the multilayered insulation.

Similar, multilayered, ceramic thermal barrier coatings are used in the aerospace industry to insulate turbine blades in gas turbine engines. Gas turbine engine parts, however, are not subjected to rapid thermal cycling as are internal combustion engine parts. Commonly assigned U.S. Pat. Nos. 4,481,237 to Bosshart et al. and 4,588,607 to Matarese et al. teach coatings that include a metallic bond coat deposited on a metal substrate, a metal/ceramic layer deposited on the bond coat, and a $ZrO_2$ ceramic top layer deposited on the metal/ceramic layer.

Although $ZrO_2$-based thermal barrier coatings allow internal combustion engines to operate under severe conditions, to date, they have not achieved the desired service life. Therefore, what is needed in the art is a thermal barrier coating that allows internal combustion engines to operate under severe conditions while achieving an acceptable service life.

DISCLOSURE OF THE INVENTION

The present invention is directed to a thermal barrier coating that allows internal combustion engines to operate under severe conditions while achieving an acceptable service life.

One aspect of the invention includes a metal article coated with a ceramic coating. The coating has a metallic bond coat deposited on the metal article, at least one MCrAlY/ceramic layer deposited on the bond coat, and a ceramic composite top layer deposited on the MCrAlY/ceramic layer. The M in MCrAlY stands for Fe, Ni, Co, or a mixture of Ni and Co. The ceramic in the MCrAlY/ceramic layer comprises mullite, alumina, zircon, sillimanite, sodium zirconium phosphate, fused silica, cordierite, aluminum titanate, or zirconia. The ceramic composite top layer comprises a ceramic matrix and at least one secondary phase.

Another aspect of the invention includes a method of making the coating described above by sequentially depositing a metallic bond coat on a metal article, at least one MCrAlY/ceramic layer on the bond coat, and a ceramic composite top layer on the MCrAlY/ceramic layer.

These and other features and advantages of the present invention will become more apparent from the following description and accompanying drawing.

BEST MODE FOR CARRYING OUT THE INVENTION

The thermal barrier coating of the present invention is a multilayer coating that includes a metallic bond coat, at least one metal/ceramic layer deposited on the bond coat, and a ceramic composite top layer deposited on the metal/ceramic layer. The coating and its individual layers can be any thickness required for a particular application. Preferably, the coating will be about 0.3 mm (12 mils) to about 5.0 mm (200 mils) thick.

Figure 1:
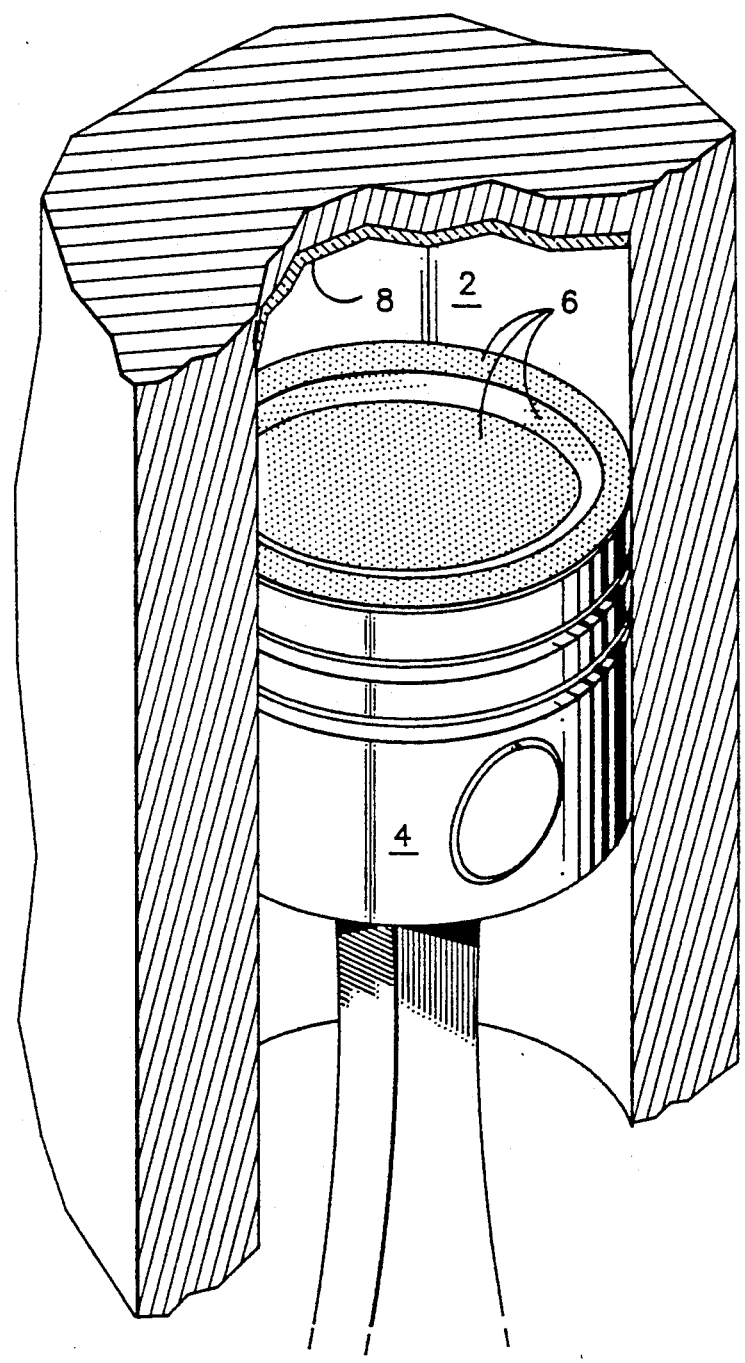
FIG. 1 is a partially broken-away perspective view of a cylinder in an internal combustion engine that in which a piston crown and a piston head firedeck are coated with a coating of the present invention.

The coatings of the present invention can be applied to any article that can benefit from the coatings' properties. For example, the coatings can be applied to components in a cylinder of an internal combustion engine that require protection from rapid thermal cycling. FIG. 1 shows a cylinder 2 of an internal combustion engine in which the top or crown of a piston 4 is coated with a coating 6 of the present invention. Similarly, a piston head firedeck, the closed portion of the cylinder 2 that faces the piston crown, can be coated with a coating 8 of the present invention. The coatings 6, 8 face the combustion chamber in the cylinder, defined by the walls of the cylinder, the piston crown, and piston head firedeck, and are exposed to rapid thermal cycling created by the cylinder firing cycle.

The bond coat can be any material known in the art that creates good bonds with a metal substrate and the metal/ceramic layer. One suitable material is a Ni-Cr-Al composition used in the aerospace industry. Such a material is commercially available as Metco ® 443 from the Metco division of Perkin-Elmer Corporation (Westbury, N.Y.). Preferably, the bond coat will be about 0.1 mm (4 mils) to about 0.15 mm (6 mils) thick.

The metal/ceramic layer can comprise a MCrAlY material, where M is Fe, Ni, Co, or a mixture of Ni and Co, and a ceramic material in any suitable proportion. The ceramic material can comprise mullite ($3Al_2O_3 \cdot 2SiO_2$), alumina ($Al_2O_3$), or any other suitable ceramic, such as zircon ($ZrSiO_4$), sillimanite ($Al_2O_3 \cdot SiO_2$), sodium zirconium phosphate ($NaZrPO_4$), fused silica ($SiO_2$), cordierite ($Mg_2Al_4Si_5O_8$), or aluminum titanate ($AlTiO_4$). MCrAlY materials are known in the aerospace industry and can be obtained from Union Carbide Specialty Powders (Indianapolis, Ind.) or Sulzer Plasma Alloy Metals (Troy, Mich.). The ceramic materials are well known and readily available. Preferably, the coating will have a first, constant composition metal/ceramic layer deposited on the bond coat and a second, graded composition metal/ceramic layer deposited on the first metal/ceramic layer. For example, the first, constant composition metal/ceramic layer can comprise about 20 wt % to about 60 wt % CoCrAlY (nominally Co-23Cr-13Al-0.65Y) and about 80 wt % to about 40% wt % mullite or $Al_2O_3$ and can be about 0.1 mm (4 mils) to about 0.5 mm (20 mils) thick. The composition of the second, graded metal/ceramic layer can vary continuously from the composition of the first metal/ceramic layer to a suitable composition having a higher proportion of mullite or $Al_2O_3$. For example, the final composition can include about 15 wt % to about 20 wt % CoCrAlY and about 85 wt % to about 80 wt % mullite. The second metal/ceramic layer can be about 0.1 mm (4 mils) to about 0.5 mm (20 mils) thick.

The ceramic composite top layer comprises a ceramic matrix and one or more secondary phases dispersed in the matrix. The matrix should have thermal properties suitable for the intended application. For example, if the coating will be used in local rapid thermal cycling applications, the matrix should be able to withstand conditions in which portions of the coating's surface vary by more than about 110° C. (200° F.), and, preferably, more than about 278° C. (500° F.), from the mean surface temperature. In addition, the matrix's thermal properties should permit the coating to survive combustion or other cyclic events that occur at least about 1 cycle per second and, preferably, at least about 15 cycles per second. To withstand such conditions, the matrix should have a coefficient of thermal expansion (CTE) less than about $5.4 \times 10^{-6} °C.^{-1}$ ($3.0 \times 10^{-6} °F.^{-1}$) and a thermal conductivity between about 1 J $sec^{-1}m^{-1}°C.^{-1}$ (7 Btu $hr^{-1}ft^{-2}(°F./in)^{-1}$) and about 1.7 J $sec^{-1}m^{-1}°C.^{-1}$ (12 Btu $hr^{-1}ft^{-2}(°F./in)^{-1}$). Preferably, the matrix's CTE will be less than about $4.9 \times 10^{-6} °C.^{-1}$ ($2.7 \times 10^{-6} °F.^{-1}$) and the thermal conductivity will be between about 1.1 J $sec^{-1}m^{-1}°C.^{-1}$ (7.5 Btu $hr^{-1}ft^{-2}(°F./in)^{-1}$) and about 1.4 J $sec^{-1}m^{-1}°C.^{-1}$ (10 Btu $hr^{-1}ft^{-2}(°F./in)^{-1}$). Matrices with these thermal properties have good thermal shock resistance and are less sensitive to thermal stresses from in-plane thermal gradients that are materials with higher CTEs. Matrix materials suitable for rapid cycling applications include mullite ($3Al_2O_3 \cdot 2SiO_2$), zircon ($ZrSiO_4$), sillimanite ($Al_2O_3 \cdot SiO_2$), sodium zirconium phosphate ($NaZrPO_4$), fused silica ($SiO_2$), cordierite ($4(Mg,Fe)O \cdot 4Al_2O_3 \cdot 10SiO_2 \cdot H_2O$), and aluminum titanate ($AlTiO_4$). These materials are readily available from commercial suppliers, such as CERAC (Milwaukee, Wis.) and Unitec Ceramic (Stafford, England). Mullite is preferred because it can readily be thermally sprayed to produce a range of porosities. Mullite coated material has a CTE of $3.8 \times 10^{-6} °C.^{-1}$ ($2.1 \times 10^{-6} °F.^{-1}$) to $4.7 \times 10^{-6} °C.^{1}$ ($2.6 \times 10^{-6} °F.^{-1}$) from room temperature to 540° C. (1000° F.) and a thermal conductivity of 1.4 J $sec^{-1}m^{-1°} C.^{-1}$ (9.6 Btu $hr^{-1}ft^{-2}(°F./in)^{-1}$) to 1.1 J $sec^{-1}m^{-1}°C.^{-1}$ (7.7 Btu $hr^{-1}ft^{-2}(°F./in)^{-1}$) from room temperature to 590° C. If the coating will be used in an application that does not involve rapid thermal cycling, a suitable ceramic material, such as one of the materials listed above, $ZrO_2$, or another ceramic, can be used as the matrix.

The secondary phase can be any ceramic material that has thermal expansion, thermal conductivity, heat capacity, and mechanical properties different from those of the matrix. By controlling the composition, structure, particle size, and amount of the secondary phase in the matrix, the composite's thermal properties, especially its thermal conductivity and CTE, and porosity can be tailored to a particular application. The secondary phase creates controlled local zones in the coating that inhibit crack propagation by deflecting and blunting cracks. As a result, the secondary phase improves the coating's overall mechanical properties. Suitable secondary phase materials include silica powder, hollow silica spheres, calcined clay, cristobalite (fused quartz), sillimanite ($Al_2O_3 \cdot SiO_2$), or cordierite ($Mg_2Al_4Si_5O_8$). Such materials can be purchased from CERAC, Kieth Ceramic Materials, Ltd. (Belvedere, Kent, England), or CE Minerals (Andersonville, Ga.). If desired, the composite can have more than one secondary phase. For example, cristobalite and silica can be used together in a high porosity ceramic composite top layer. Preferably, the secondary phase will be added as a powder to powdered matrix material to produce an agglomerated and/or pre-reacted powder. Such powders can create coatings with repeatable properties and structures and a fine, homogeneous distribution of the secondary phase in the matrix. Alternately, the matrix and secondary phase can be mixed together in a calcined clay. The secondary phase should make up about 5 wt % to about 50 wt % of the ceramic composite top layer. The thickness and porosity of the ceramic composite top layer should be selected to provide a thermal conductivity and CTE that result in low in-plane thermal stresses. Low in-plane thermal stresses are important to make a durable coating. In some applications, for example, the ceramic composite top layer can have a porosity of about 10% to about 70% and be about 0.25 mm (10 mils) to about 1.5 mm (60 mils) thick.

All layers of the thermal barrier coating of the present invention can be deposited with conventional methods, such as the plasma spray methods described in commonly assigned U.S. Pat. Nos. 4,481,237 to Bosshart et al. and 4,588,607 to Matarese et al., both of which are incorporated by reference. To achieve good results, the particles sprayed in each step should be agglomerated and/or prealloyed, or fused and crushed, of uniform composition, and be between about 10 μm and about 240 μm in diameter. For a coating with a porosity of about 40% to about 70%, the secondary phase powder particles should be between about 44 μm and about 240 μm in diameter. This particle size distribution can produce controlled levels of interconnected porosity without the use of a fugitive polymer. During deposition, the substrate should be at a temperature of about 200° C. (400° F.) to about 480° C. (900° F.). A person skilled in the art will know the appropriate spray parameters. The plasma spray process parameters should be selected to provide particle temperatures high enough to achieve good particle to particle bonding but low enough to avoid fully melting and splatting the particles. Fully melted particles would produce a denser, less porous coating than that of the present invention.

The following examples demonstrate the present invention without limiting the invention's broad scope.

EXAMPLE 1

A ceramic composite coating of the present invention was prepared by first depositing a 0.1 mm Metco ® 443 (Metco division of Perkin Elmer Corp., Westbury, N.Y.) Ni-Cr-Al bond coat and two 0.5 mm CoCrAlY/$Al_2O_3$ layers onto a steel substrate. The first CoCrAlY/$Al_2O_3$ layer had a constant composition of 60 wt % CoCrAlY and 40 wt % $Al_2O_3$. The second CoCrAlY/$Al_2O_3$ layer was graded and had a final composition of 20 wt % CoCrAlY and 80 wt % $Al_2O_3$. Next, a ceramic composite top layer was deposited on top of the second CoCrAlY/$Al_2O_3$ layer. The ceramic composite top layer was made from a thorough mixture of 80 wt % mullite powder (CERAC, Milwaukee, Wis.) and 20 wt % $SiO_2$ powder (CERAC). Both powders had particles that ranged from about 10 μm to about 150 μm in diameter. All four layers were deposited with a Metco external injector spray gun operated at 35 kW with nitrogen primary gas and hydrogen secondary gas. The substrate was held at about 260° C. (500° F.) during deposition. The powder delivery parameters included a feed rate of 72 g/min and a carrier flow of 5.2 standard l/min, standard set points for ceramic materials. After deposition, the top layer of the coating had a porosity of about 25%.

EXAMPLE 2

A second ceramic composite coating of the present invention was prepared as in Example 1. The bond coat and two CoCrAlY/$Al_2O_3$ layers were identical to those in Example 1. The ceramic composite top layer was made from a thorough mixture of 70 wt % mullite powder (CERAC) and 30 wt % Mulcoa TM 70 calcined clay (CE Materials, Andersonville, GA). The mullite powder had particles between about 10 μm and about 150 μm in diameter. The Mulcoa TM 70 calcined clay had a composition of about 87 wt % mullite and about 13 wt % silica and particles between about 44 μm and about 240 μm in diameter. The spray parameters were identical to those in Example 1. After deposition, the top layer of the coating had a porosity of about 25%.

EXAMPLE 3

A third ceramic composite coating of the present invention was prepared as in Example 1. The bond coat and two CoCrAlY/$Al_2O_3$ layers were identical to those in Example 1. The ceramic composite top layer was made Mulcoa TM 70 calcined clay (CE Materials) that had a composition of about 87 wt % mullite and about 13 wt % silica. The calcined clay had particles that ranged from about 44 μm to about 240 μm in diameter. The spray parameters were identical to those in Example 1. After deposition, the top layer of the coating had a porosity of about 55%.

EXAMPLE 4

Figure 2:
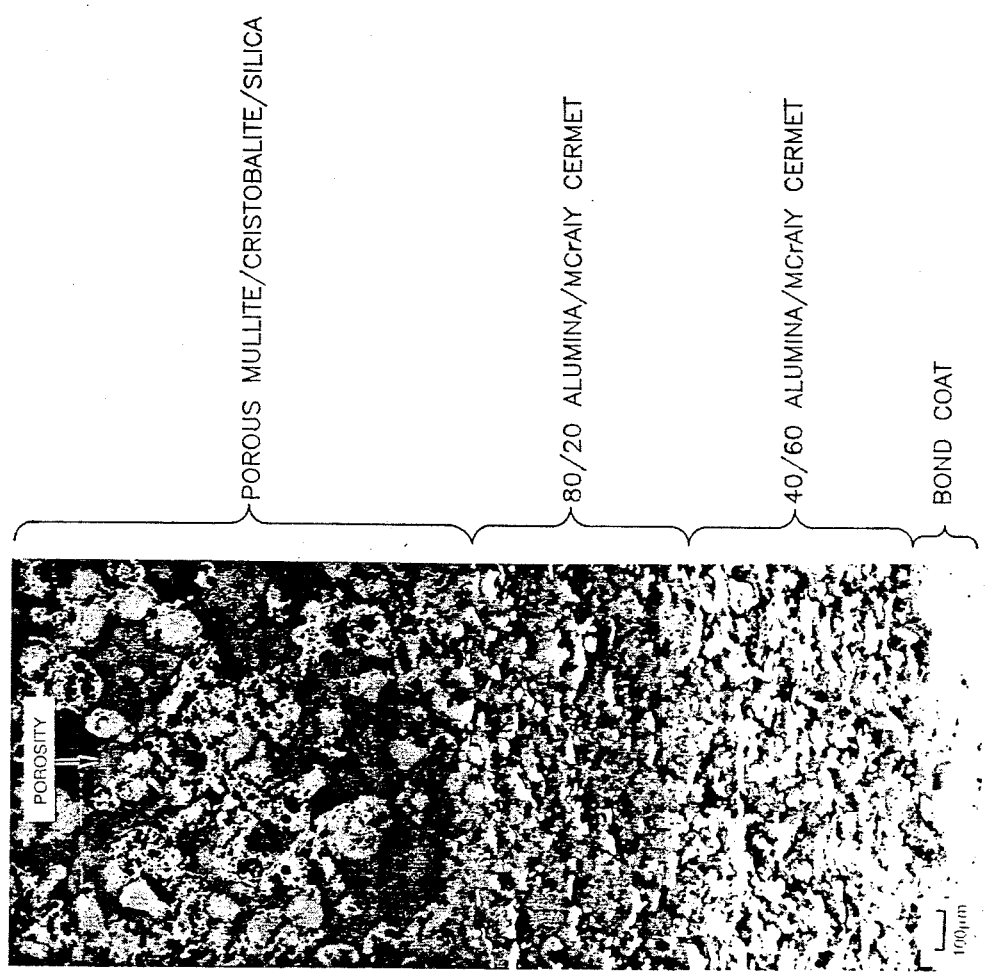
FIG. 2 is a photomicrograph of a highly porous coating of the present invention.

A fourth ceramic composite coating of the present invention was prepared as in Example 1. The bond coat and two CoCrAlY/$Al_2O_3$ layers were identical to those in Example 1. The ceramic composite top layer was made from Mulcoa TM 47 calcined clay (CE Materials) that had a composition of about 65 wt % mullite, about 15 wt % cristobalite, and about 20 wt % silica. The calcined clay had particles that ranged from about 44 μm to about 240 μm in diameter. The spray parameters were identical to those in Example 1. After deposition, the top layer of the coating had a porosity of about 55%. FIG. 2 is a photomicrograph of this coating.

Examples 3 and 4 show that thermal barrier coatings with a ceramic top layer porosity of greater than 40% can be made without using a fugitive polymer during the thermal spray process. As a result, the coatings of the present invention do not require a bake-out step to remove a fugitive material and produce large, interconnected pores.

The coatings from Examples 1–4 and two baseline coatings were subjected a series of thermal cycles to determine their durability. The first baseline coating had a 0.1 mm Ni-Cr-Al bond coat, a 0.5 mm constant composition CoCrAlY/$ZrO_2$ layer with 60 wt % CoCrAlY and 40 wt % $ZrO_2$, a 0.5 mm graded composition CoCrAlY/$ZrO_2$ layer with a final composition of 20 wt % CoCrAlY and 80 wt % $ZrO_2$, and a 0.5 mm $ZrO_2$ top layer. The second baseline coating had a 0.1 mm Ni-Cr-Al bond coat, a 0.5 mm constant composition CoCrAlY/mullite layer with 60 wt % CoCrAlY and 40 wt % mullite, a 0.5 mm graded composition CoCrAlY/mullite layer with a final composition of 20 wt % CoCrAlY and 80 wt % mullite, and a 0.5 mm mullite top layer. A cycle consisted of locally heating the coatings to 850° C. with an oxy-acetylene torch while cooling the back sides of the samples to 650° C. with air jets for 30 sec followed by 30 sec of cooling. The cycle was repeated until the samples showed significant cracking or delamination from the steel substrate. The first baseline coating delaminated after about 1 hour of testing. The baseline coatings showed significant cracking and coating uplift after about 3 hours of testing. By contrast, the four coatings of the present invention showed little or no cracking after the same amount of time.

The tests described above show that the coatings of the present invention can provide longer service lives than coatings without ceramic composite top layers. The secondary phase in the ceramic composite top layer allows the thermal conductivity and thermal expansion properties of coating of the present invention to be tailored to a particular application. As a result, in-plane thermal stresses due to local hot spots can be decreased while achieving a desired thermal conductance. The secondary phase also improves the coating's fracture toughness by deflecting and blunting cracks. As a result, internal combustion engines that incorporate a coating of the present invention can operate at more severe conditions and provide better performance and efficiency than prior art engines. The coating can be applied to piston crowns, piston head firedecks, and any other in-cylinder parts that require insulation.

The coatings of the present invention also can extend the service of life of parts used in other applications, whether they involve rapid thermal cycling or not. For example, coatings of the present invention can be used on injector nozzles in glass furnaces, coal gasifier nozzle injectors, high performance exhaust systems for gasoline engines, jet engine turbine blades, and other applications.

The invention is not limited to the particular embodiments shown and described herein. Various changes and modifications may be made without departing from the spirit or scope of the claimed invention.

We claim:

1. A metal article coated with a ceramic coating, wherein the coating comprises:
   (a) a metallic bond coat deposited on the metal article,
   (b) at least one MCrAlY/ceramic layer deposited on the bond coat, wherein M is Fe, Ni, Co, or a mixture of Ni and Co, and the ceramic in the MCrAlY/ceramic layer comprises mullite, alumina, zircon, sillimanite, sodium zirconium phosphate, fused silica, cordierite, aluminum titanate, or zirconia, and
   (c) a ceramic composite top layer deposited on the MCrAlY/ceramic layer, wherein the ceramic composite top layer comprises a ceramic matrix having a coefficient of thermal expansion less than about $5.4 \times 10^{-6} °C.^{-1}$ and a thermal conductivity between about 1 J $sec^{-1}m^{-1}°C.^{-1}$ and about 1.7 J $sec^{-1}m^{-1}°C.^{-1}$ and at least one secondary phase dispersed in the matrix such that the secondary phase inhibits crack propagation in the ceramic composite top layer.

2. The article of claim 1, wherein the matrix of the ceramic composite top layer comprises a ceramic with a coefficient of thermal expansion less than about $4.9 \times 10^{-6} °C.^{-1}$ and a thermal conductivity between about 1.1 J $sec^{-1}m^{-1}°C.^{-1}$ and about 1.4 J $sec^{-1}m^{-1}°C.^{-1}$.

3. The article of claim 1, wherein the matrix comprises mullite and the secondary phase comprises silica powder, wherein the ceramic top layer has a porosity between about 10% and about 40%.

4. The article of claim 1, wherein the matrix comprises mullite and the secondary phase comprises calcined clay, wherein the ceramic top layer has a porosity between about 10% and about 40%.

5. The article of claim 1, wherein the ceramic matrix and secondary phase are formed from a calcined clay that comprises mullite and silica, wherein the ceramic top layer has a porosity between about 40% and about 70%.

6. The article of claim 1, wherein the ceramic matrix and secondary phase are formed from a calcined clay that comprises mullite, cristobalite, and silica, wherein the ceramic top layer has a porosity between about 40% and about 70%.

7. An internal combustion engine including a cylinder with a top side and a bottom side; a piston disposed in the cylinder such that the piston is free to move in the cylinder, wherein the piston has a piston crown that faces the top side of the cylinder; and a piston head firedeck that closes the top side of the cylinder, wherein the piston crown and piston head firedeck together define a variable volume combustion chamber in the cylinder; wherein the improvement comprises a thermal barrier coating on the piston crown comprising:
   (a) a metallic bond coat deposited on the piston crown,
   (b) at least one MCrAlY/ceramic layer deposited on the bond coat, wherein M is Fe, Ni, Co, or a mixture of Ni and Co, and the ceramic in the MCrAlY/ceramic layer comprises mullite, alumina, zircon, sillimanite, sodium zirconium phosphate, fused silica, cordierite, or aluminum titanate, and
   (c) a ceramic composite top layer deposited on the MCrAlY/ceramic layer, wherein the ceramic composite top layer comprises a ceramic with a coefficient of thermal expansion less than about $5.4 \times 10^{-6} °C.^{-1}$ and a thermal conductivity between about 1 J $sec^{-1}m^{-1}°C.^{-1}$ and about 1.7 J $sec^{-1}m^{-1}°C.^{-1}$ and at least one secondary phase dispersed in the matrix such that the secondary phase inhibits crack propagation in the ceramic composite top layer.

8. The internal combustion engine of claim 7, wherein the piston head firedeck is coated with the same coating as the piston crown.

9. The internal combustion engine of claim 7, wherein the matrix of the ceramic composite top layer comprises mullite, zircon, sillimanite, sodium zirconium phosphate, fused silica, cordierite, or aluminum titanate.

10. The internal combustion engine of claim 7 wherein the secondary phase in the ceramic composite top layer comprises silica, hollow silica spheres, calcined clay, cristobalite, sillimanite, or cordierite.

11. A method of coating a metal article with a ceramic coating, comprising:
    (a) depositing a metallic bond coat on the metal article,
    (b) depositing at least one MCrAlY/ceramic layer on the bond coat, wherein M is Fe, Ni, Co, or a mixture of Ni and Co, and the eramic in the MCrAlY/ceramic layer comprises mullite, alumina, zircon, sillimanite, sodium zirconium phosphate, fused silica, cordierite, aluminum titanate, or zirconia, and
    (c) depositing a ceramic composite top layer on the MCrAlY/ceramic layer, wherein the ceramic composite top layer comprises a ceramic matrix having a coefficient of thermal expansion less than about $5.4 \times 10^{-6} °C.^{-1}$ and a thermal conductivity between about 1 J $sec^{-1}m^{-1}°C.^{-1}$ and about 1.7 J $sec^{-1}m^{-1}°C.^{-1}$ and at least one secondary phase dispersed in the matrix such that the secondary phase inhibits crack propagation in the ceramic composite top layer.

12. The method of claim 11, wherein the ceramic composite top layer is made from a mullite powder and a silica powder, wherein substantially all particles in both powders are between about 10 $\mu$m and about 150 $\mu$m in diameter and the ceramic composite top layer has a porosity between about 10% and about 40%.

13. The method of claim 11, wherein the ceramic composite top layer is made from a mullite powder and a calcined clay, wherein substantially all particles in the mullite powder are between about 10 $\mu$m and about 150 $\mu$m in diameter, substantially all particles in the calcined clay are between about 44 $\mu$m and about 240 $\mu$m in diameter, and the ceramic composite top layer has a porosity between about 10% and about 40%.

14. The method of claim 11, wherein the ceramic composite top layer is made from a calcined clay that comprises mullite and silica, wherein substantially all particles in the calcined clay are between about 44 $\mu$m and about 240 $\mu$m in diameter and the ceramic top layer has a porosity between about 40% and about 70%.

15. The method of claim 11, wherein the ceramic composite top layer is made from a calcined clay that comprises mullite, cristobalite, and silica, wherein substantially all particles in the calcined clay are between about 44 $\mu$m and about 240 $\mu$m in diameter and the ceramic composite top layer has a porosity between about 40% and about 70%.

* * * * *

UNITED STATES PATENT AND TRADEMARK OFFICE
CERTIFICATE OF CORRECTION

PATENT NO. : 5,305,726
DATED : April 26, 1994
INVENTOR(S) : Alan J. Scharman et al.

It is certified that error appears in the above-indentified patent and that said Letters Patent is hereby corrected as shown below:

<u>Col. 7</u>
In Claim 1, line 26, delete "and about 1.7 $J\ sec^{-1}m^{-1} \cdot C^{-1}$ Signed and Sealed this Nineteenth Day of November, 1996

Attest:

BRUCE LEHMAN

Attesting Officer     Commissioner of Patents and Trademarks